(12) United States Patent
Wolff et al.

(10) Patent No.: US 9,464,690 B2
(45) Date of Patent: *Oct. 11, 2016

(54) CHAIN LINK AND METHOD FOR FORMING CHAIN LINK

(71) Applicant: Wolff Industries, Inc., Spartanburg, SC (US)

(72) Inventors: David H. Wolff, Chesnee, SC (US); David Vogel, Columbus, IN (US)

(73) Assignee: Wolff Industries, Inc., Spartanburg, SC (US)

(*) Notice: Subject to any disclaimer, the term of this patent is extended or adjusted under 35 U.S.C. 154(b) by 0 days.

This patent is subject to a terminal disclaimer.

(21) Appl. No.: 14/931,904

(22) Filed: Nov. 4, 2015

(65) Prior Publication Data

US 2016/0053855 A1    Feb. 25, 2016

Related U.S. Application Data

(63) Continuation of application No. 14/134,216, filed on Dec. 19, 2013, now Pat. No. 9,205,991.

(51) Int. Cl.

| | |
|---|---|
| *B65G 25/00* | (2006.01) |
| *F16G 15/02* | (2006.01) |
| *B65G 17/42* | (2006.01) |
| *A22C 21/00* | (2006.01) |
| *B65G 17/46* | (2006.01) |
| *B29C 45/14* | (2006.01) |
| *B29D 29/06* | (2006.01) |
| *B65G 17/40* | (2006.01) |
| *F16G 15/12* | (2006.01) |
| *B29C 45/00* | (2006.01) |

(52) U.S. Cl.
CPC ............ *F16G 15/02* (2013.01); *A22C 21/0053* (2013.01); *B29C 45/14* (2013.01); *B29D 29/06* (2013.01); *B65G 17/40* (2013.01); *B65G 17/42* (2013.01); *B65G 17/46* (2013.01); *F16G 15/12* (2013.01); *B29C 45/006* (2013.01); *B65G 2201/0202* (2013.01); *B65G 2207/38* (2013.01)

(58) Field of Classification Search
CPC ...... B65G 17/42; B65G 17/46; B65G 25/00; A22C 21/00; B29C 45/14; B29D 29/06
USPC ....................................... 59/78, 93
See application file for complete search history.

(56) References Cited

U.S. PATENT DOCUMENTS

| | | | |
|---|---|---|---|
| 2,460,524 | A | 2/1949 | Morin |
| 4,385,419 | A | 5/1983 | Cantrell |
| 4,886,156 | A | 12/1989 | Records et al. |
| 6,491,157 | B1 | 12/2002 | Kölling et al. |
| 6,688,461 | B1 | 2/2004 | Frazier et al. |
| 7,278,536 | B1 | 10/2007 | Harrison et al. |
| 2006/0201790 | A1 | 9/2006 | Verduijn et al. |
| 2015/0175357 | A1 | 6/2015 | Wolff et al. |

*Primary Examiner* — David B Jones
(74) *Attorney, Agent, or Firm* — Dority & Manning, P.A.

(57) ABSTRACT

Chain links and methods for forming chain links are provided. A method may include inserting a pin into a pin hole defined in a boss insert, and introducing the boss insert to a mold cavity defined in a mold plate of a mold assembly. The method further includes flowing chain link substrate to the mold cavity, and cooling the chain link substrate such that a chain link is formed. The chain link includes a base portion, a platform extending from the base portion, and a rib assembly extending from the platform and including a plurality of ribs and defining a central pocket. The boss insert is disposed in the pocket, and the pin is disposed in the pin hole of the boss insert.

24 Claims, 7 Drawing Sheets

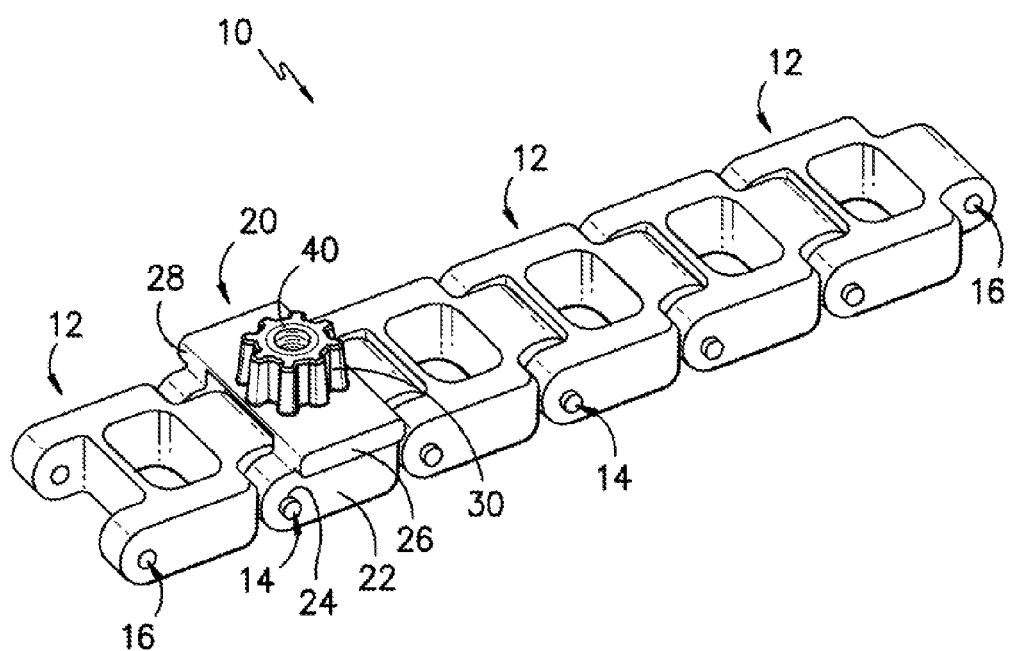
FIG. -1-

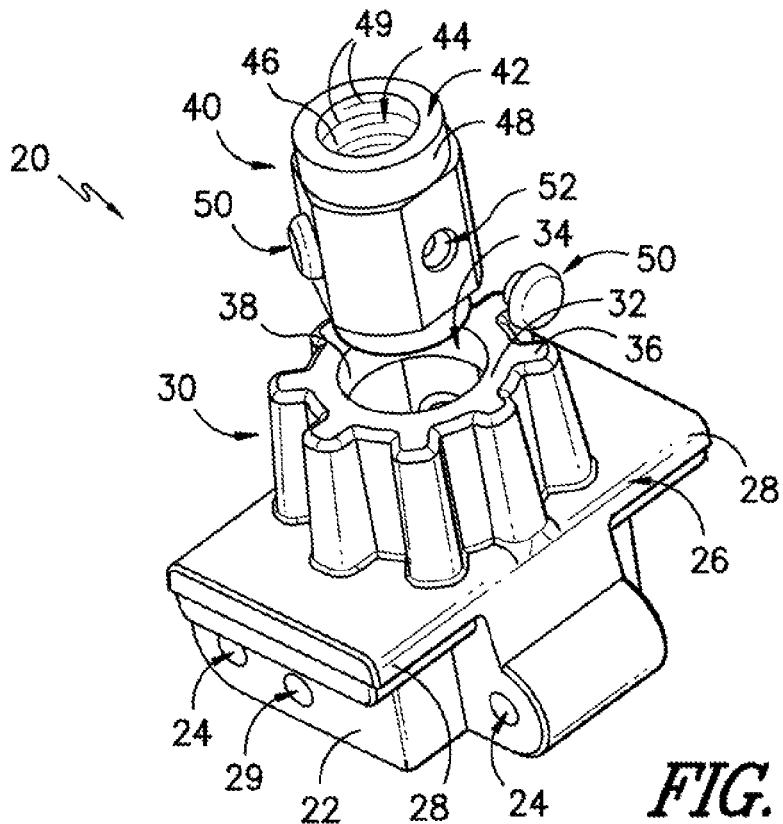
FIG. -2-
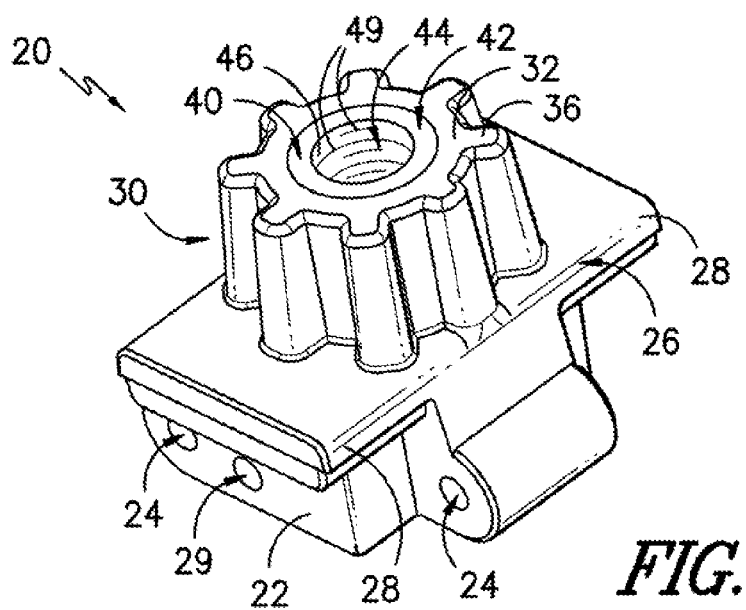
FIG. -3-

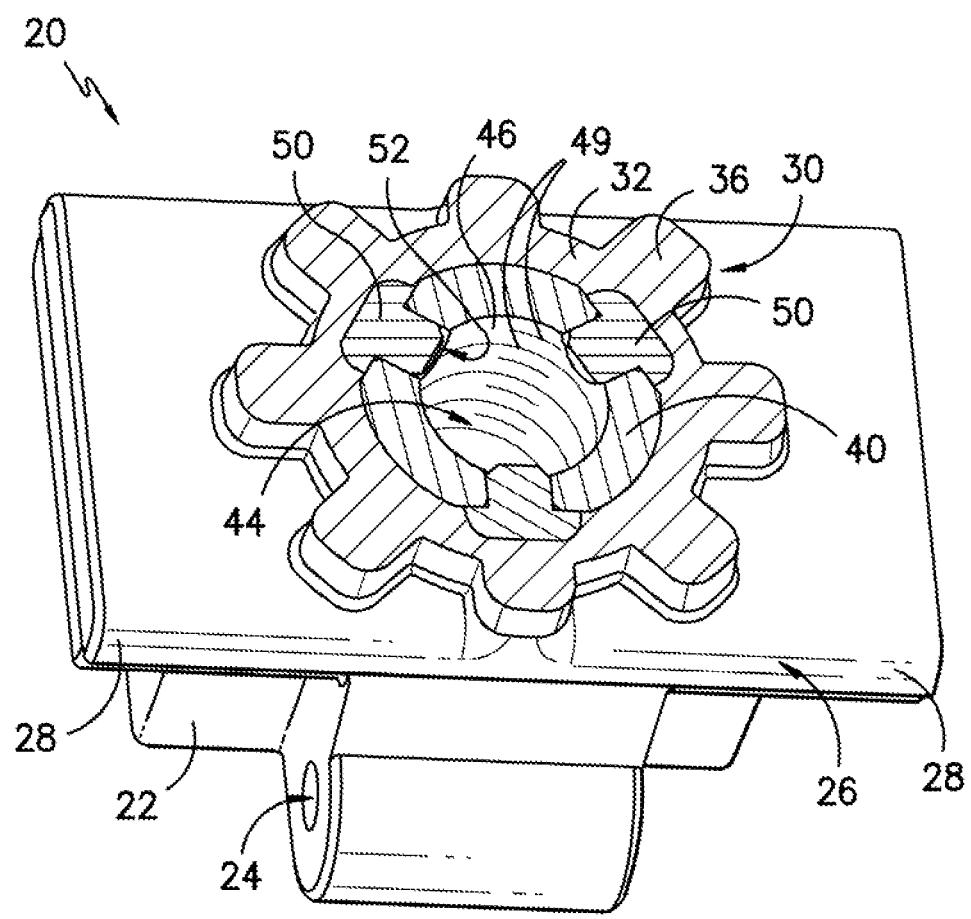
FIG. —4—

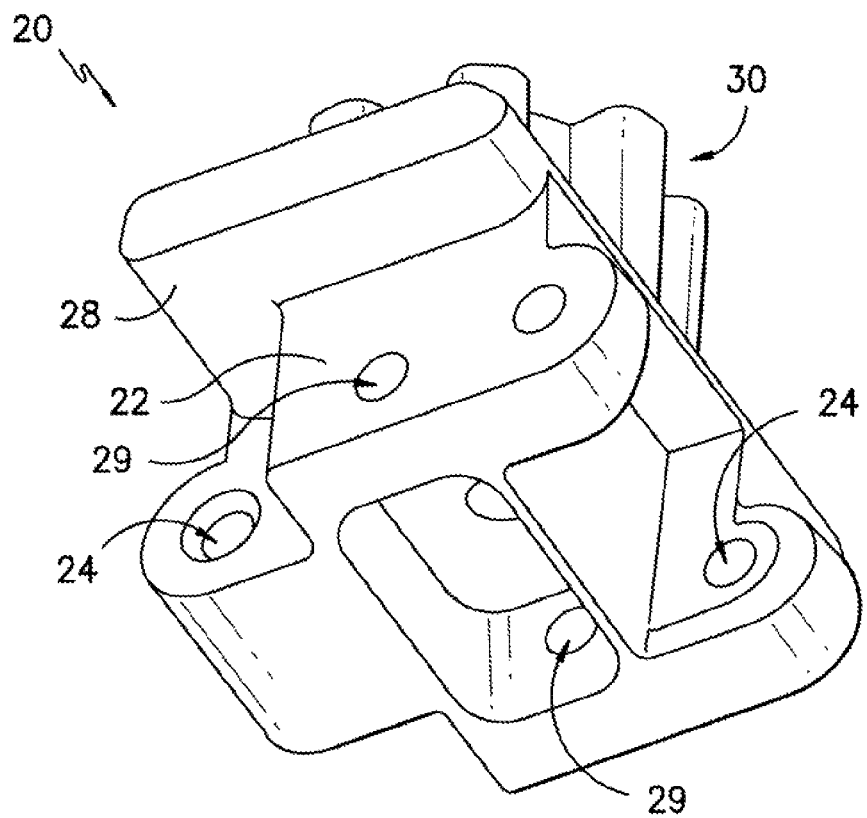
FIG. -5-
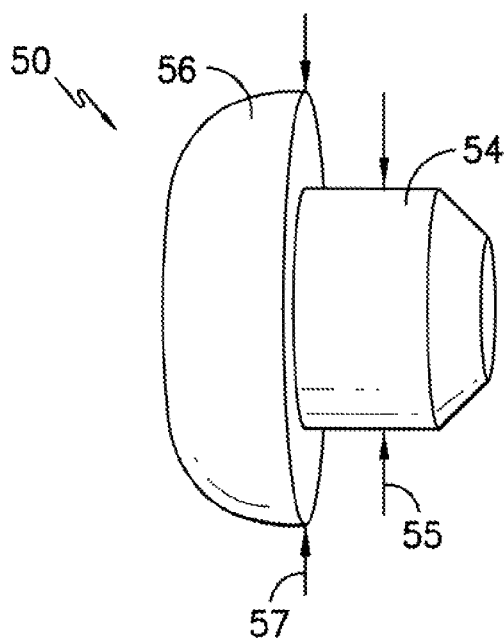
FIG. -6-

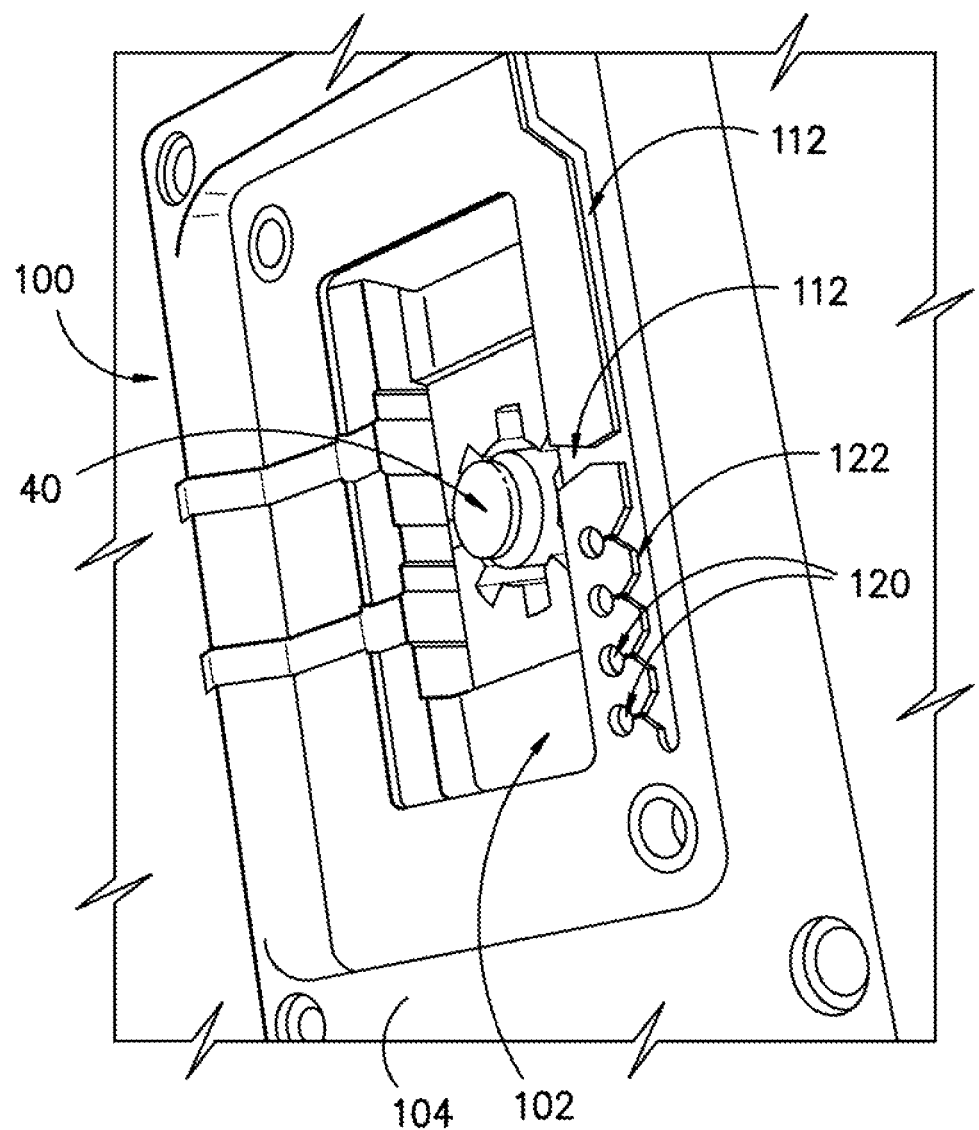
FIG. -7-

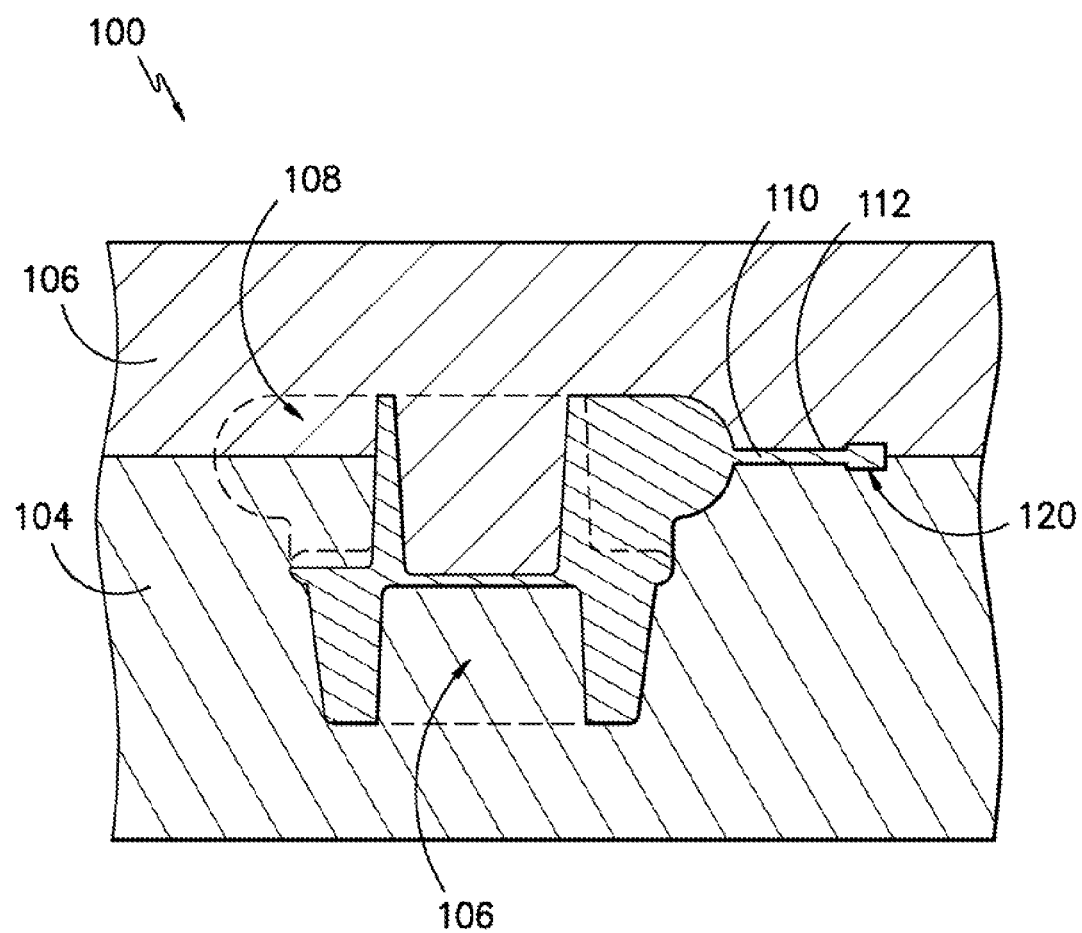
FIG. -8-

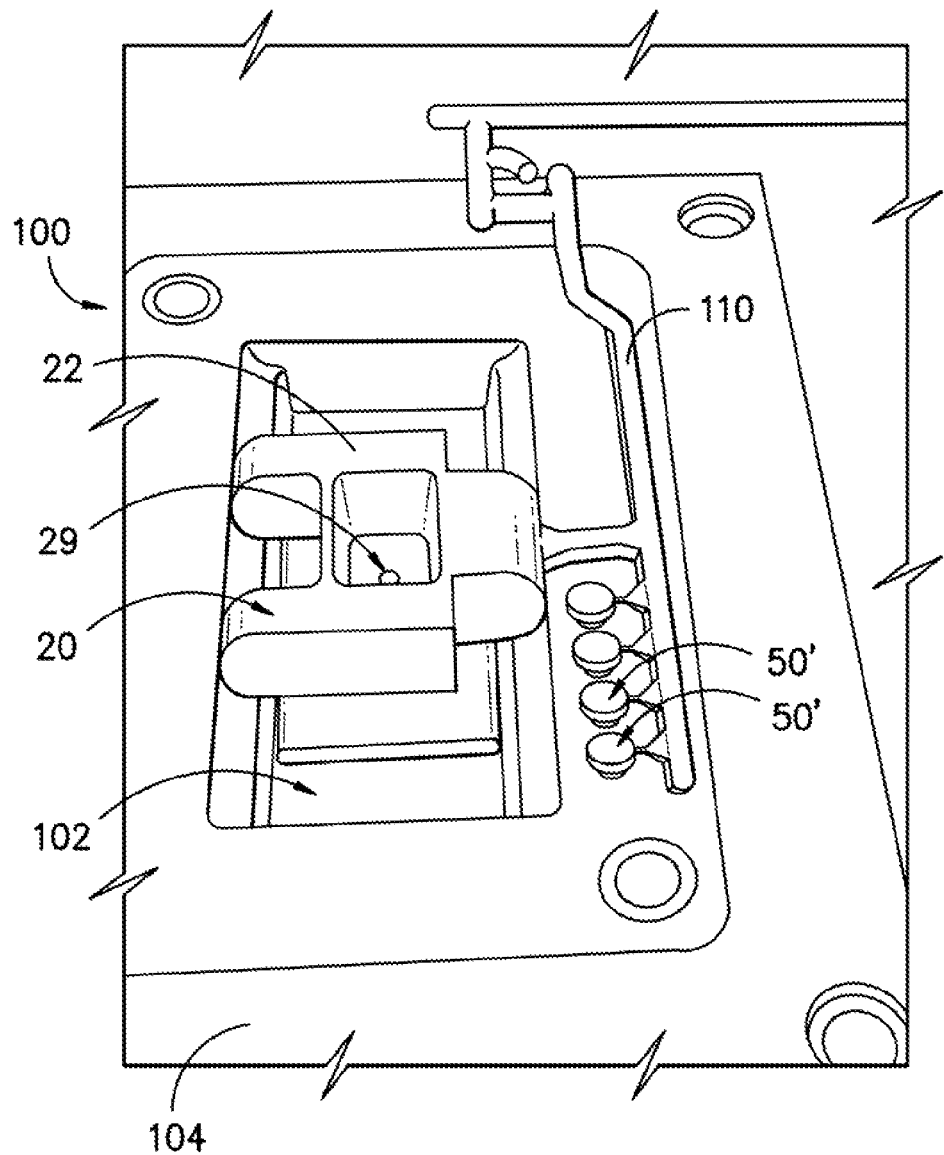
FIG. -9-

CHAIN LINK AND METHOD FOR FORMING CHAIN LINK

CROSS REFERENCE TO RELATED APPLICATION

This application claims priority as a continuation application of U.S. patent application Ser. No. 14/134,216 having a filing date of Dec. 19, 2013 and titled "Chain Link and Method for Forming Chain Link", which is incorporated by reference herein in its entirety for all purposes.

TECHNICAL FIELD

The present disclosure relates generally to chain links for conveyor chain, and more particularly to particularly formed chain links and methods for forming such chain links.

BACKGROUND

Conveyor belts and chains are utilized in a wide variety of applicants for numerous purposes. Many conveyor chains include a plurality of chain links which are linked together to form the conveyor chain. Such links and conveyor chains generally must be capable of supporting a load which is transmitted along and by the conveyor chain.

One specific application of such conveyor chains is in poultry processing lines. Typically, poultry carcasses are supported on a conveyor chain in a production line on which the carcasses are deboned and/or otherwise processed. U.S. Pat. No. 7,278,536, entitled "Molded plastic conveyor chain member for processing poultry" and which is incorporated by reference herein in its entirety, provides one example of a conveyor chain and the various links utilized with such belt for poultry processing applications. In particular, the '536 patent provides various spaced apart links in the conveyor chain which are capable of supporting rods therein. Poultry carcasses are mounted on the rods for processing. These links of the '536 patent are entirely integrally formed of plastic in order to be lightweight and efficient.

However, such links have various disadvantages. For example, the rods supported by such links are typically formed from a metal such as stainless steel. The interaction between the different materials of the metal rod and plastic link may cause damage to the plastic link, thus weakening the connection between the link and rod. Further, such links formed entirely of plastic may generally be relatively unstable.

Accordingly, improved chain links and methods for forming such chain links would be advantageous. In particular, chain links that are relatively stable and which facilitate improved connections with metal rods coupled thereto would be desired, and methods which provide such chain links would additionally be desired.

SUMMARY

Aspects and advantages of the invention will be set forth in part in the following description, or may be obvious from the description, or may be learned through practice of the invention.

In one embodiment, the present disclosure is directed to a chain link. The chain link includes a base portion, a platform extending from the base portion, and a rib assembly extending from the platform. The rib assembly includes a plurality of ribs disposed in an annular array and a tube from which the ribs extend, the tube defining a central pocket. The chain link further includes a boss insert disposed in the central pocket, the boss insert comprising an insert body defining a central bore, the insert body comprising an inner wall and an outer wall, the inner wall defining the central bore.

In another embodiment, the present disclosure is directed to a method for forming a chain link. The method includes inserting a pin into a pin hole defined in a boss insert, and introducing the boss insert to a mold cavity defined in a mold plate of a mold assembly. The method further includes flowing chain link substrate to the mold cavity, and cooling the chain link substrate such that a chain link is formed. The chain link includes a base portion, a platform extending from the base portion, and a rib assembly extending from the platform and including a plurality of ribs and defining a central pocket. The boss insert is disposed in the pocket, and the pin is disposed in the pin hole of the boss insert.

In another embodiment, the present disclosure is directed to a method for forming a chain link. The method includes flowing chain link substrate to a mold cavity defined in a mold plate of a mold assembly, and flowing chain link substrate to a pin mold cavity defined in the mold plate. The method further includes cooling the chain link substrate such that a chain link is formed. The chain link includes a base portion, a platform extending from the base portion, and a rib assembly extending from the platform and including a plurality of ribs and defining a central pocket. The method further includes cooling the chain link substrate such that a pin is formed, the pin insertable into a pin hole defined in a boss insert.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 is a perspective view of a portion of a conveyor chain in accordance with one embodiment of the present disclosure;

FIG. 2 is a perspective assembled view of a chain link for a conveyor chain in accordance with one embodiment of the present disclosure;

FIG. 3 is a perspective exploded view of a chain link for a conveyor chain in accordance with one embodiment of the present disclosure;

FIG. 4 is a perspective cutaway view of a portion of a chain link for a conveyor chain, illustrating an interaction between a bore insert, associated pins and a rib assembly of the chain link, in accordance with one embodiment of the present disclosure;

FIG. 5 is another perspective assembled view of a chain link for a conveyor chain in accordance with one embodiment of the present disclosure;

FIG. 6 is a side view of a pin for use with a chain link in accordance with one embodiment of the present disclosure;

FIG. 7 is a perspective view of a first mold plate of a mold assembly for forming a chain link in accordance with one embodiment of the present disclosure;

FIG. 8 is a cross-sectional view of a mold assembly, including a first mold plate and a second mold plate, for forming a chain link in accordance with one embodiment of the present disclosure; and FIG. 9 is a perspective view of a chain link and a plurality of subsequent pins in a first mold plate of a mold assembly for forming a chain link in accordance with one embodiment of the present disclosure.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present disclosure is directed to chain links for conveyor chains, and in particular to distinctly designed chain links for conveyor chains utilized in poultry processing applications. Such distinctly designed chain links are provided at intervals in a conveyor chain, between normally designed chain links. The distinct chain links of the present disclosure are generally designed to support rods which are coupled thereto, and on which poultry carcasses may be mounted for processing. Further, distinct chain links according to the present disclosure advantageously include inserts which provide improved stability and improved rod connections. Additionally, pins or stop nuts may be utilized to couple the inserts to the remainder of the distinctly designed chain links. The pins, as well as related methods for forming such chain links, may facilitate excellent connection between an insert and associated remainder of a distinctly designed chain link, particularly in cases wherein the insert is formed from a material different from the remainder of a distinctly designed chain link.

FIG. 1 illustrates a portion of an exemplary conveyor chain 10. Conveyor chain includes a plurality of normal chain links 12. Such links 12 are coupled successively to one another by pins 14 which are retained in holes 16 defined in the links 12, as illustrated. A chain according to the present disclosure may be designed to travel in a generally straight direction around a loop, or around a radius, or in any other suitable direction.

As further illustrated in FIG. 1, distinctly designed chain links 20 are also utilized in conveyor chain 10. Such chain links 20 are placed at intervals between normal chain links 12. A chain link 20 according to the present disclosure may include a base portion 22, which may for example be similar or identical to at least a portion of normal chain links 12. Such base portion 22 may thus couple with links 12, such as through use of pins 14 retained in holes 24 defined in the base.

Additionally, one or more drain holes 29 (see FIGS. 2, 3 and 5) may be defined in the base portion 22, and may for example extend laterally therethrough, through which fluids may drain during operation. Such drain holes 29 may be defined during initial forming of the chain link 20, such as during a molding process, or may be defined in the chain link 20 after initial forming by, for example, drilling the drain holes 29 into the base portion 22.

Referring now to FIG. 1 as well as FIGS. 2 through 5, a chain link 20 according to the present disclosure may include various other components extending from the base portion 22. For example, a platform 26 may extend, such as generally vertically, from the base portion 22. Platform 26 may include, for example, generally laterally-extending ledges or flanges 28 which may engage in wear strip slots (not shown) along both sides of the conveyor chain 10, to provide stability against tipping during travel and operations to be conducted.

Further, a rib assembly 30 may extend, such as generally vertically, from the platform 26. Rib assembly 30 may include various features to stabilize and support a rod (not shown), such as a stainless steel rod, coupled to the chain link 20 for poultry processing applications. For example, rib assembly 30 may include a tube 32 which defines a central pocket 34. Rib assembly 30 may further include a plurality of ribs 36 extending from the tube 32, such as generally radially from the tube 32. Ribs 36 may be disposed in a generally annular array and may generally stabilize tube 32, in which a rod may be provided. Tube 32 may have an inner surface 38 which generally defines the central pocket 34. The inner surface 38 may, for example, be generally smooth, or have a texture that corresponds to the texture of the outer surface of an insert provided in the central pocket 34, as discussed below. In particular, the inner surface 38 may not include threads, such as inner female threads, defined thereon.

In exemplary embodiments, such variously described components of the chain link 20 may be integral. For example, the base portion 22, platform 26, and rib assembly 30 may be integral, and integrally formed utilizing for example a suitable molding technique. For example, and as discussed in particular below, injection molding may be utilized to form chain link 20, and the base portion 22, platform 26, and rib assembly 30 may be integrally formed during such injection molding. Accordingly, in exemplary embodiments, the base portion 22, platform 26, and rib assembly 30 may be formed from the same material, which may for example be a plastic such as a thermoplastic. Propylene and acetal are examples of suitable materials. It should be understood, however, that the present disclosure is not limited to such materials, and that any suitable material are within the scope and spirit of the present disclosure. Further, in some embodiments, normal chain links 12 may be formed of the same material as such components.

A chain link 20 according to the present disclosure may further include a boss insert 40. The boss insert 40 may generally be disposed in the central pocket 34 of the rib assembly 30, and may be configured for coupling the rod thereto. As illustrated, boss insert 40 may include an insert body 42, which may define a central bore 44 which may for example extend vertically therethrough. Insert body 42 may include an inner wall 46, which may define the central bore 44, and an outer wall 48.

In exemplary embodiments as illustrated, at least a portion of inner wall 46 may be threaded, and may thus include threads 49 defined thereon. Such threads 49 may interface with mating threads (not shown) of a rod coupled to the boss insert 40 and thus the chain link 20 generally.

In some embodiments, boss insert 40 may be provided in a mold for molding the chain link 20, and rib assembly 30 may be formed around the boss insert 40. In other embodiments, boss insert 40 may be inserted into the central pocket 34 after the rib assembly 30 is formed. Further, in exemplary embodiments, boss insert 40 may be formed from a material that is different from the material of other components of the chain link 20, such as the base portion 22, platform 26, and rib assembly 30. Further, boss insert 40 may in exemplary embodiments not be integral with such components. For example, boss insert 40 may be formed from a metal, such as in exemplary embodiments stainless steel. The use of stainless steel or another suitable metal may advantageously improve the stability of the chain link 20 in general, particularly when a rod is attached thereto, and may further facilitate improved rod connections. In some exemplary embodiments, for example, boss insert 40 and the rod to be connected thereto may be formed of the same material. It should be understood, however, that the present disclosure is not limited to such materials, and that any suitable material are within the scope and spirit of the present disclosure.

Referring now to FIGS. 2, 4 and 6, in some embodiments a chain link 20 may further include one or more pins 50 or stop nuts. Pins 50 may generally connect and secure boss insert 40 to the remainder of the chain link 20, such as to the rib assembly 30. Each pin 50 may thus, as illustrated, be disposed in and extend from a corresponding pin hole 52 defined in boss insert 40. Each pin hole 52 may extend, such as generally radially, through insert body 42. Each pin hole 52 may further be defined in outer wall 46 and, in some embodiments, inner body 44. A pin 50 may include a first portion disposed within pin hole 52 and a second portion disposed exterior to the pin hole 52 and boss insert 40 when the pin 50 is generally disposed in the corresponding pin hole 52. The first portion may for example be a body 54 having a maximum width (or diameter) 55. The second portion may for example be a head 56 having a maximum width (or diameter) 57. In exemplary embodiments, the maximum width 57 may be greater than the maximum width 55. The width 55 and cross-sectional area and shape may allow body 54 to generally fit within pin hole 52, while the width 57 and cross-sectional area and shape may prevent head 56 from fitting within pin hole 52.

The portion of pins 50 extending from and exterior to respective pin holes 52, such as the heads 56, may in exemplary embodiments be coupled to rib assembly 30, such as the tube 32 thereof. For example, pins 50 may be inserted in pin holes 52 before the boss insert 40 is provided in a mold for molding the chain link 20, and the rib assembly 30 may be formed around the boss insert 40 and pins 50. Further, in some embodiments, the pins 50 may be integral with the rib assembly 30. For example, during molding, the temperature of the pins 50 may be raised sufficiently such that the pins 50 at least partially melt. Upon cooling of the chain link 20, pins 50 may solidify integrally with the rib assembly 30.

In some embodiments, pins 50 may be formed from the same material as the rib assembly 30, as well as the base portion 22 and platform 26. Such materials facilitate the melting and integrally solidifying of the pins 50. In any event, pins 50 in exemplary embodiments may be formed from a suitable plastic, such as a thermoplastic. Propylene and acetal are examples of suitable materials. It should be understood, however, that the present disclosure is not limited to such materials, and that any suitable material are within the scope and spirit of the present disclosure.

It should be noted that FIG. 4 illustrates pins 50 integral with a rib assembly 30, and that the cross-hatching and outlining of the pins 50 are merely for illustrative purposes only to illustrate the locations of the pins 50.

The present disclosure is further directed to methods for forming chain links 20. In exemplary embodiments, as discussed above, chain links 20 may be formed through molding, such as injection molding. Further, and advantageously, pin 50 for use in chain links 20 may additionally be formed during such molding. For example, subsequent pins 50' for use with subsequent chain links 20 may be formed simultaneously with formation of a chain link 20, which may utilize previously formed pins 50, in an injection molding process.

FIGS. 7 through 9 illustrate exemplary embodiments of a mold assembly 100 for forming a chain link 20 according to the present disclosure. A method according to the present disclosure may include, for example, inserting one or more pins 50 into respective pin holes 52 defined in a boss insert 40, as discussed above. A method may further include, for example, introducing the boss insert 40 to a mold cavity 102 defined in a mold plate 104 of the mold assembly, as illustrated in FIG. 7. Mold plate 104 may, for example, be a lower mold plate 104, and mold assembly 100 may further include an upper mold plate 106 which may include a mold cavity 108 defined therein. The mold cavities 102, 108 may together define a mold cavity for forming a chain link 20 therein when the lower and upper mold plates 104, 106 are brought together during the molding process, as illustrated in FIG. 8.

A method according to the present disclosure may further include, for example, flowing chain link substrate 110 to the mold cavities 102, 108. For example, mold plates 104, 106 may include runners 112 defined therein, through which substrate 110 may be flowed. Runners 112 may be in fluid communication with the cavities 102, 108, such that the substrate 110 may flow through runners 112 and into cavities 102, 108. Such substrate 110 in the cavities 102, 108 may surround the boss insert 40 and pins 50. Further, in exemplary embodiments, the temperature within the cavities 102, 108 and/or the temperature of the substrate 110 may cause pins 50 to at least partially melt, as discussed above. Thus, a method according to the present disclosure may further include, for example, melting the pins 50.

FIG. 9 illustrates a chain link 20 disposed in mold plate 104 after substrate 110 has flowed to the cavities 102, 108 to form the chain link 20 and the mold plate 106 has been separated from the mold plate 104. A method according to the present disclosure may further include, for example, cooling the chain link substrate 110 such that a chain link 20 is formed. Cooling may be performed by, for example, the ambient environment, or by a cooling bath of a suitable liquid, such as water. The resulting chain link 20 may include a base portion 22, platform 26, and rib assembly 30, as well as in exemplary embodiments pins 50, formed from chain link substrate 110. Chain link substrate 110 in exemplary embodiments may be a suitable plastic, as discussed above with respect to the various components. Further, in exemplary embodiments as discussed above, pins 50 may be integral with the rib assembly 30 after cooling of the chain link 20. Boss insert 40 may be formed from a material different from the chain link substrate 110 and the pins 50, such as from a suitable metal as discussed above.

Further, in some embodiments, a method according to the present disclosure may include flowing chain link substrate 110 to pin mold cavities 120 defined in the mold plate 104 and, optionally mold plate 106. For example, runners 122, which may be in fluid communication with runners 112, may flow a portion of the chain link substrate 110 to pin mold cavities 120, to facilitate the formation of subsequent pins 50' for use with subsequent chain links 20. A method according to the present disclosure may further include, for example, cooling the chain link substrate 110 such that subsequent pins 50' may be formed. The flowing step and/or cooling step may in exemplary embodiments be performed generally simultaneously with flowing chain link substrate 110 to the mold cavities 102, 108 and cooling the chain link substrate 110 to form a chain link 20, respectively.

Thus, subsequent pins 50' for insertion into subsequent boss inserts 40 and for use in subsequent chain links 20 can be formed during formation of a chain link 20, which in turn may utilize previously formed pins 50. The formation of such pins 50' in such manner advantageously increases the efficiency of the molding process and thus results in increased yet inexpensive chain link 20 yield.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for forming a chain link, the method comprising:
    inserting a pin into a pin hole defined in a boss insert;
    introducing the boss insert to a mold cavity defined in a mold plate of a mold assembly;
    flowing chain link substrate to the mold cavity; and
    cooling the chain link substrate such that a chain link is formed, the chain link comprising a base portion, a platform extending from the base portion, a tube extending from the platform and defining a central pocket, the boss insert disposed in the pocket, and the pin disposed in the pin hole of the boss insert.

2. The method of claim 1, wherein the base portion, the platform and the tube are formed from the chain link substrate.

3. The method of claim 1, wherein the pin is formed from the chain link substrate.

4. The method of claim 1, wherein the chain link substrate is a plastic.

5. The method of claim 1, wherein the pin is formed from a plastic.

6. The method of claim 1, wherein the boss insert is formed from a material different from the pin and the chain link substrate.

7. The method of claim 1, wherein the boss insert is formed from a metal.

8. The method of claim 1, wherein the pin is inserted into the pin hole such that a first portion of the pin is disposed within the pin hole and a second portion of the pin is disposed exterior to the boss insert.

9. The method of claim 8, wherein the first portion is a body and the second portion is a head, the head having a maximum width greater than a maximum width of the body.

10. The method of claim 1, further comprising melting the pin.

11. The method of claim 1, wherein after cooling the chain link substrate the pin is integral with the tube.

12. The method of claim 1, further comprising:
    flowing chain link substrate to a pin mold cavity defined in the mold plate;
    cooling the chain link substrate such that a subsequent pin is formed.

13. A method for forming a chain link, the method comprising:
    flowing chain link substrate to a mold cavity defined in a mold plate of a mold assembly;
    flowing chain link substrate to a pin mold cavity defined in the mold plate;
    cooling the chain link substrate such that a chain link is formed, the chain link comprising a base portion, a platform extending from the base portion, and a tube extending from the platform and defining a central pocket; and
    cooling the chain link substrate such that a pin is formed, the pin insertable into a pin hole defined in a boss insert.

14. The method of claim 13, wherein the chain link substrate is a plastic.

15. The method of claim 13, wherein the boss insert is formed from a material different from the chain link substrate.

16. The method of claim 13, wherein the boss insert is formed from a metal.

17. The method of claim 13, wherein the pin comprises a body and a head, the head having a maximum width greater than a maximum width of the body.

18. A chain link, comprising:
    a base portion;
    a platform extending from the base portion;
    a tube extending from the platform, the tube defining a central pocket; and
    a boss insert disposed in the central pocket, the boss insert comprising an insert body defining a central bore, the insert body comprising an inner wall and an outer wall, the inner wall defining the central bore.

19. The chain link of claim 18, wherein the boss insert further comprises a pin hole defined in the insert body, and further comprising a pin disposed in the pin hole.

20. The chain link of claim 19, wherein the pin is integral with the tube.

21. The chain link of claim 18, wherein at least a portion of the inner wall is threaded.

22. The chain link of claim 18, wherein the boss insert is formed from a material different from the material of the base portion, the platform and the tube.

23. The chain link of claim 18, wherein the boss insert is formed from a metal.

24. The chain link of claim 18, wherein the base portion, the platform and the tube are integral.

* * * * *